United States Patent
Harris, Sr. et al.

[15] 3,677,448
[45] July 18, 1972

[54] SYRINGE WITH WIRE PLUNGER FOR DISPENSING INFINITESIMALLY SMALL, ACCURATELY MEASURED QUANTITIES OF FLUID

[72] Inventors: Rano J. Harris, Sr.; Rano J. Harris, Jr., both of Baton Rouge, La.

[73] Assignee: Precision Sampling Corporation

[22] Filed: Jan. 29, 1971

[21] Appl. No.: 110,900

[52] U.S. Cl. ..........................................222/387, 128/218 C
[51] Int. Cl. ......................................................G01f 11/00
[58] Field of Search...............128/215, 218 NV, 218 C, 234; 141/329; 222/309, 386, 387

[56] References Cited

UNITED STATES PATENTS

| | | | |
|---|---|---|---|
| 1,015,276 | 1/1912 | Rowse | 128/218 NV |
| 3,203,455 | 8/1965 | Horabim | 128/218 C |
| 3,401,692 | 9/1968 | Harris, Sr. | 128/218 C |

*Primary Examiner*—Robert B. Reeves
*Assistant Examiner*—James M. Slattery

*Attorney*—Llewellyn A. Proctor

[57] ABSTRACT

A syringe for use in dispensing infinitesimally small, accurately measured quantities of fluid. The syringe is comprised generally of a tubular body, a needle and lateral vent-valve assembly mounted in the forward end of the tubular body. The needle and lateral vent-valve assembly comprises a resilient tubular body, a tubular plunger guide mounted at one side thereof and within the axial opening of the tubular body, a needle mounted on the resilient tubular body at the forward or opposite side of the tubular guide and an on-off valved lateral vent communicated to the bores through the hollow needle, the resilient tubular member and the plunger guide. The plunger assembly includes a telescoping tubular member which is reciprocably mounted upon the plunger guide, and a wire plunger associated therewith which extends through the bore of the plunger guide, the resilient tubular member with which it is snugly fitted and sealed, and is loosely fitted through the bore of the needle. The wire plunger traverses the length of the needle and the annulus formed between the external surface of the plunger and inter wall surface of the needle can be readily cleaned or filled with an accurately measured quantity of fluid when the valve is open and injected when the valve is closed.

8 Claims, 5 Drawing Figures

FIG. 2.

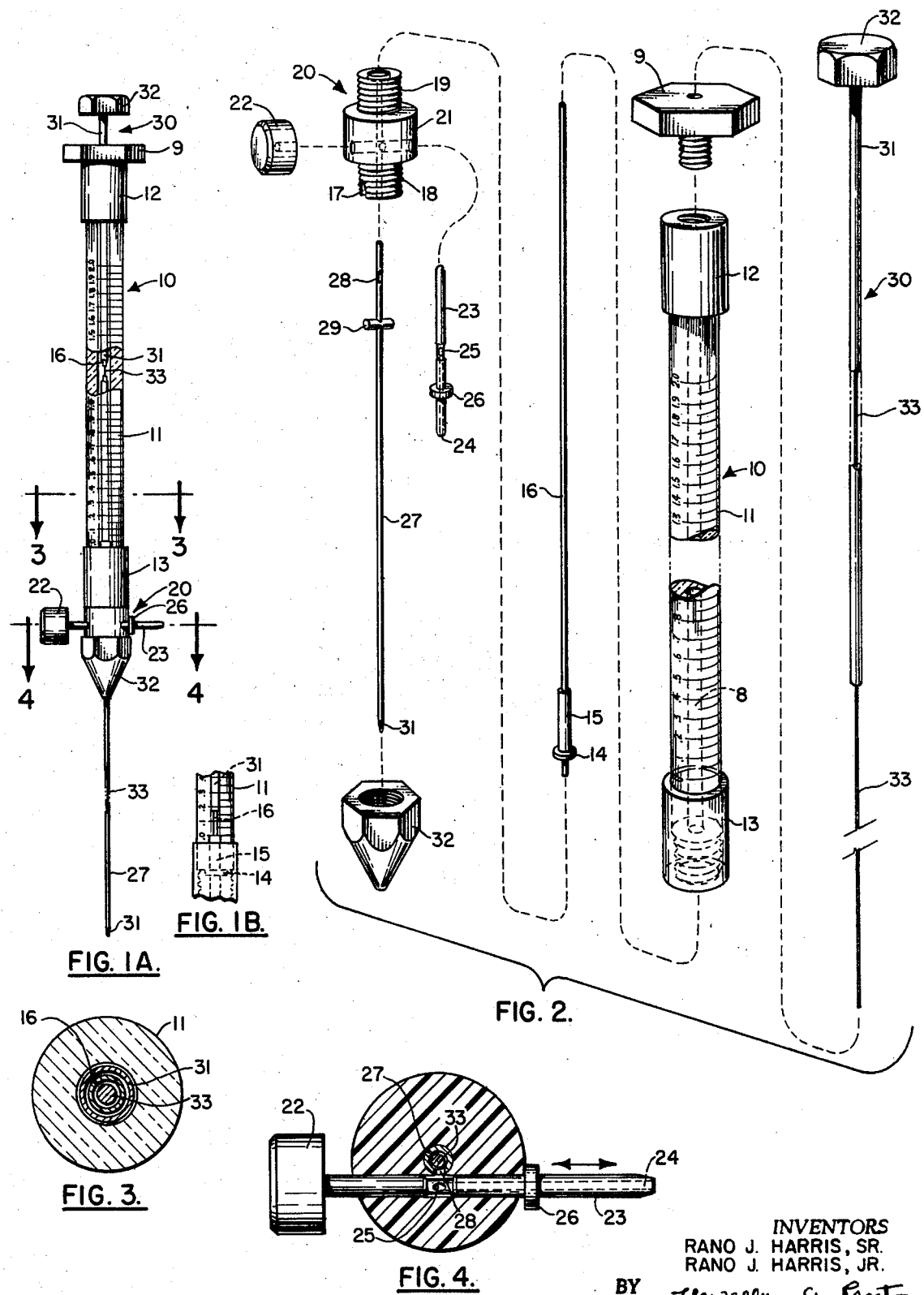

SYRINGE WITH WIRE PLUNGER FOR DISPENSING INFINITESIMALLY SMALL, ACCURATELY MEASURED QUANTITIES OF FLUID

Needle syringes have gained wide acceptance by the scientific community for use in dispensing infinitesimally small, accurately measured fluid specimens, e.g., to modern analytical instruments such as mass spectrometer and gas chromatographs. Such syringes embody apparatus comprising a tubular body, on the forward end of which is fitted a hollow or tubular needle and, at the opposite end, a slidable plunger which travels within the tubular body. In the most accurate of existing syringes, the measured fluid to be dispensed is contained within the hollow needle itself and a small wire travels the length of the needle, this constituting the plunger. Syringes of this character are capable of dispensing very small fluid specimens measured on the order of 1 or 2 microliters, and smaller fractions thereof.

Certain difficulties, inherent in past syringes of this type, have been overcome in part by the dual seal syringe of Rano J. Harris, Jr., described in U.S. Pat. No. 3,401,692 which issued Sept. 17, 1968. This syringe, characterized as having a lateral vent and an effective dual sealing arrangement comprising high pressure seals within the syringe bore on both sides of the lateral vent, has been effective in improving the accuracy of fluid measurement and delivery by obviating leakage and bypass of fluid around the face of the plunger into the annulus. This design has also proven useful in providing a means for cleaning the wire plunger and inside wall of the needle of contaminants from previous usages, and for more accurately filling the needle with small measured volumes of fluid. Another patent which discloses a syringe of this general type is U.S. Pat. No. 3,203,455 to T. S. Horabin, which issued Aug. 31, 1965.

The syringe embodied by the present invention provides further improvements over these and other prior art devices.

Among the objects of this invention are:

To provide a new and improved needle syringe which is capable of more rapidly measuring out infinitesimally small, accurately measured fluid specimens, particularly fractional increments representative of the total volumetric capacity of a given syringe.

To provide a syringe of simple structure which can be filled by simply setting the plunger to a scale for the amount of fluid desired for dispensing, and then simply touching the needle to a fluid source to effect withdrawal therefrom by capillary action.

To provide a syringe particularly adapted to measure out highly volatile fluids without significant error introduced by vaporization and creation of bubbles, or vapor lock, due to plunger withdrawal at the time of sampling.

To provide a new and more durable syringe of simple structure, particularly one wherein there are no complicated alignments to be made between seals such as can cause excessive wear and create manufacturing difficulties.

These and other objects are achieved in accordance with the present invention which embodies a syringe comprising, in combination, a tubular body within the forward end of which is provided a needle and lateral vent-valve assembly, and within the opposite end of which is fitted a plunger group. The needle and lateral vent-valve assembly of the syringe is comprised of a resilient tubular member at the forward end of which is mounted a hollow or tubular needle, at the opposite end of which is mounted a tubular plunger guide which extends into the axial opening of the tubular body, and a valved lateral opening which extends from the exterior to the axial opening through the said resilient tubular body. A reciprocably mounted thin wire plunger extends through the bore of the tubular plunger guide, through the axial opening of the resilient tubular member and into the bore of the needle. The wire plunger is The wire plunger is of small external diameter than the internal diameter of the bore of the needle, and traversable therein.

A feature of the invention, in view of the structural aspects thereof, is that when the valve is open fluid can flow freely through the needle annulus in either direction, or pumped forcibly, to clean the needle bore and plunger surface. A unique advantage is that the wire plunger can be set back from the dispensing end of the needle to fill the needle bore with any desired amount of fluid. A profound advantage is that the desired amount of the fluid can be capillaried upwardly into the needle bore without movement of the plunger. This makes measurements quicker and quite simple, and there is no need to over-fill and then reject a portion of the specimen prior to dispensing fractional portions. Another profound advantage is that highly volatile specimens can be taken from a source without significant vaporization and creation of bubbles, or vapor lock, which would interfere with the accuracy of measurements. In dispensing the measured fluid specimen, it is only necessary to close the valve and push the plunger forward. The location of passage of the wire plunger through the resilient tubular member forms a seal which prevents escape of fluid from the opposite end of the needle. These features form a considerable advantage over prior art syringes.

The invention, and its principle of operation, will be more fully understood by reference to the following detailed description of a specific embodiment, and to the attached drawings to which reference is made in the description. In the description, similar numbers are used to represent similar parts or components.

In the drawings:

FIG. 1A depicts a longitudinal partial section view of a syringe embodying the present invention.

FIG. 1B is a fragmentary view of a portion of the syringe of the preceding figure, depicting the zero filling feature.

FIG. 2 depicts an exploded view of the syringe described in the first figure of the drawings.

FIG. 3 is an enlarged Section 3—3 of FIG. 1, showing in some detail the plunger assembly.

FIG. 4 is an enlarged view taken along Section 4—4 of FIG. 1, showing in some detail the lateral vent-valve assembly portion of the syringe.

Referring generally to FIG. 1A there is shown a syringe comprised of a tubular body 10 at the forward end of which is located a needle and lateral vent-valve assembly 20. A plunger assembly 30, including a wire plunger 33 which reciprocably traverses the length of the needle 27, of the needle and lateral vent-valve assembly 20 is provided at the opposite end of the tubular body 10.

The tubular body 10 is formed by an enclosing wall 11, providing a relatively large axial opening 8 therethrough for containment of the plunger assembly 30. It can be constituted of virtually any rigid material, e.g., metal, glass, plastic or the like, but generally is constructed of a transparent material such as glass or plastic upon which is scribed indicia marks for aid in the measurement of fluid specimens, as depicted. For structural reasons, the tubular body 10 is generally capped at the ends by internally threaded tubular members or collars 12,13, both of which can be threadably attached or otherwise affixed to the said tubular member. The forward end of collar 13 is threadably adapted for receipt of the needle and lateral vent-valve assembly 20, and the collar 12 at the opposite end of the tubular body 10 is adapted for receipt of a capping member 9, the total assembly 9,12 constituting a ferrule. These portions of the syringe body are generally constructed of a durable material, preferably metal.

The needle and lateral vent-valve assembly 20 is comprised of a resilient tubular member 21 with externally threaded projecting shanks 18,19 of smaller diameter than that of the central portion of the said member. In assembled position, one of the shanks 19 is threadably engaged to the internally threaded collar 13, mounted at the forward end of the tubular body 10. A plunger guide member 16, provided with a small collar 15 constituting a plunger stop, is contained with the axial opening of, and held in place atop, the threaded shank 19. Over-insertion of the plunger guide member 16 is prevented by means of the enlarged portion 14 of collar 15. A hollow or tubular needle 27, preferably provided with a taper or point 31 at the forward or dispensing end thereof, is snugly mounted with the axial opening through the said tubular member 21. The needle 27, the opposite end of which is provided with a side port or opening 28, is provided with one or a pair of projecting lugs 29 which rests within a slot 17 at the forward end of the tubular member 21, this feature preventing over-insertion of the needle and maintaining proper orientation of the needle opening 28 within the assembly.

The needle 27 is held in place within the needle and lateral vent-valve assembly by a lock nut or hub 32. In positioning the needle 27 in place, its forward end is passed through the axial or central opening within the hub 32, and the hub is then screwed onto the externally threaded projecting shank 18.

In place, the needle and lateral vent-valve assembly 20 are positioned upon the forward end of the tubular body 10, the major portion of the tubular plunger guide member 16 being thrust into the axial opening 8 of tubular body 10, and coaxially aligned therewith. The assembly is held in place by threadable engagement between the externally threaded shank 19 of tubular member 21 and the internally threaded collar 13. In the assembly the bores of needle 27 and plunger guide member 16 are in straight line alignment and open one to the other through the axial opening of tubular member 21. This central opening can be shut off or opened to the atmosphere by means of the valve structure best described by specific reference to FIG. 4. A lateral opening is thus communicated with the axial opening through the resilient tubular member 21, and therein is inserted a snugly fitting reciprocably movable tubular stem 23. In the stem position shown in FIG. 4, wherein the stem 23 is pushed to the left so that the stop 26 abuts the outer wall of tubular member 21, the valve is open. The continuous axial opening or bore through tubular member 21, and the bores of needle 27 and plunger guide member 16, are open to the atmosphere via the axial opening 24 and side opening 25 of stem 23, and opening 28 of needle 27. When the tubular stem 23 is moved in the opposite direction, wherein the push button 22 is impinged against the outer wall of tubular member 11, the valve is closed. In this position the opening 25 is covered by the surrounding wall 11 and closed off from the opening 28 of needle 27.

In assembled position, the plunger assembly 30 is thrust through the central opening of the capping member 9, which is threadably engaged to collar 12 forming a ferrule at the opposite end of tubular body 10. The plunger assembly 30 is constituted of a cylindrical or tubular member 31 which is rigidly affixed to thumb button 32, and a wire plunger 33 is mounted along the central axis of the tubular member 31. The tubular member 31 is telescoped with the smaller diameter tubular plunger guide member 16 and the wire plunger 33 is passed through the bore of tubular plunger guide member 16. The wire plunger 16 is of sufficient length to pass to the very tip 31 of needle 27 when the plunger button 32 is pressed all the way inward, and reciprocation is sufficient that the wire plunger 32 is movable throughout the entire length of the bore of needle 27.

The wire plunger 33 is of smaller external diameter than then internal diameter of the bore of needle 27 leaving an annular space between the inside wall surface of the needle and the external surface of the wire plunger. This provides a structure which makes it feasible to readily clean the external surface of the wire plunger and inside wall of the needle of contaminants by simply opening the valve and drawing a purging liquid upwardly, or forcing it downwardly, through the openings 24,25 of stem 23, opening 28 and the bore of needle 27. Liquid cannot pass into the bore of plunger guide member 16 because of the tight fit or seal between the wire plunger and the axial opening through the resilient tubular member 21. In addition, when it is desired to withdraw a measured whole or fractional portion of a liquid specimen from a source for dispensing, it is only necessary to withdraw the wire plunger back the desired amount and liquid will capillary upwardly from the source to fill the space within the needle bore from which the wire plunger 33 has been withdrawn, and also the annular opening between the external surface of the wire plunger and the inside wall of the needle. For example, when the forward end of the tubular member 31 abuts collar 15 of plunger guide 16, the scale reading of the indicia marks scribed on the wall 11 of tubular body 10 is zero, and the forward end of wire plunger 33 flushes with tip 31 of needle 27. When the plunger is withdrawn, e.g., to a reading of 0.2 microliters as shown by direct reference to FIG. 1B, this amount of liquid capillaries upwardly from a source (not shown) and displaces the space in the needle bore formerly occupied by the wire plunger 33. To dispense this amount of liquid the valve is closed and the plunger is pushed forward until the scale reading is again zero. This action can be repeated ad infinitum to measure and dispense any whole or fractional portion of liquid as may be desired.

It is apparent that various modifications and changes can be made without departing the spirit and scope of the present invention. For example, in the assembly it is apparent that the purpose of the plunger group is to maintain alignment of, and to guide the thin wire plunger through the continuous bore formed by the bore through the plunger guide, the bore through the resilient tubular member, and the bore of the needle. A seal is formed between the wire plunger and its location of passage through the resilient tubular member.

The resilient tubular member is preferably formed of a rigid or semi-rigid, resilient form of plastic or plastic-like material. The self-lubricated plastics are especially preferred in this capacity, and can also be applied as a laminate or protective film. The polyfluorinated ethylene polymers, notable among which is polytetrafluoroethylene (Teflon), are particularly outstanding. Conventional resilient or elastic-like materials, such as natural or synthetic rubbers, can also be employed.

The plunger assembly, collars, needle and other portions of the syringe are preferably constructed of metals, e.g., ferrous metals such as iron, iron alloys, steel, stainless steels, and the like; or such metals as brass, copper, bronze, chrome, alloys of these and other metals, and the like.

It is apparent that various changes, such as in the absolute or relative dimensions of the parts, materials used, and the like, as well as the suggested mode of withdrawing or delivering fluids, can be made without departing the spirit and scope of the invention, as will be apparent to those skilled in this art.

Having described the invention, what is claimed is:

1. In a syringe for dispensing infinitesimally small, accurately measured quantities of fluids the combination comprising a tubular body formed by an enclosing wall defining an axial opening, a needle and lateral vent-valve assembly mounted at the forward end of the said tubular body wherein is included a resilient tubular member formed by an enclosing wall defining an axial opening, sealing the forward end of the said tubular body, a hollow needle, provided with a side opening, mounted within the axial opening at the forward end of the said resilient tubular member, said needle being inserted within the axial opening to a depth sufficient that the side opening lies within the axial opening of the said resilient tubular member, a tubular plunger guide, formed by an enclosing wall providing an axial bore through the said guide, a portion of which lies within the said tubular body and a terminal portion of which is snugly mounted and sealed within the axial opening of the said resilient tubular member, at the side opposite the hollow needle, a lateral opening within the said resilient tubular member connecting with and adjoining the side opening of the hollow needle, valve means for opening and closing the said lateral opening, a plunger assembly mounted at the end of the said tubular body, opposite the needle and lateral vent-valve assembly, wherein is included a tubular member telescoped upon the said tubular plunger guide, reciprocably movable thereon and within the axial opening of the said tubular body, a thin wire plunger, affixed at an end to the rear of the tubular member, extending within the bore of the said tubular plunger guide, through the axial opening of the resilient tubular member and the bore of the needle, the inside diameter of which needle opening is greater than the external diameter of the said wire plunger, whereby when the valve is open, fluid can be withdrawn or capillaried into the said annular opening of the needle as for cleaning purposes, and for measurement of the fluid therein in the quantity desired for dispensing.

2. The apparatus of claim 1 wherein the lateral opening extends through the resilient tubular member and the valve means for opening and closing the said lateral opening comprises a hollow stem, closed at one end and provided with a side opening, reciprocably mounted within the lateral opening of the resilient tubular member so that the open end of the stem is perpetually open to the atmosphere and the side opening of the stem can be communicated with the needle side opening at one stem position to open the valve, or moved out of communication with the needle side opening to close the valve.

3. The apparatus of claim 2 wherein the resilient tubular member is constructed of Teflon.

4. The apparatus of claim 3 wherein a push button is mounted on the closed end of the stem to facilitate opening and closing of the valve.

5. The apparatus of claim 2 wherein the hollow needle is provided with a projecting lug located between the tip and the side opening of the needle, the forward and rearward sides of the resilient tubular member are of smaller diameter than the center portion of the said tubular member and provided with external threads, the forward end of the tubular body is provided with an internally threaded collar for threadable engagement with the rearward shank, the forward shank is provided with a recess within which the lug can lie for maintenance of the proper orientation and stability of the needle, and for threadable engagement with an externally threaded needle hub through a central opening of which the needle can be projected and held in place by threadable engagement between the needle hub and forward end of the said resilient tubular member.

6. The apparatus of claim 2 wherein the plunger assembly is comprised of an end button, a tubular member mounted perpendicularly upon a face of the said end button, the said tubular member having an internal diameter substantially equal to the external diameter of the plunger guide upon which it is mounted, and the wire plunger is affixed upon the face of the button.

7. The apparatus of claim 6 wherein the plunger group extends through a central opening within a ferrule mounted on the rear of the tubular body.

8. The apparatus of claim 6 wherein the tubular body is constructed of a transparent plastic material scribed with indicia marks, the forward portion of the plunger guide is provided with an enlarged collar, the rear portion of which coincides with the zero fill position defined by the scribed indicia marks, and the forward end of the tubular member of the plunger group abuts the collar when the tip of the wire plunger lies at the tip of the needle.

* * * * *